United States Patent [19]

Dulany et al.

[11] Patent Number: 5,585,456
[45] Date of Patent: Dec. 17, 1996

[54] REPULPABLE WET STRENGTH RESINS FOR PAPER AND PAPERBOARD

[75] Inventors: Margaret A. Dulany, Decatur; Chad E. Garvey, Ball Ground; Clay E. Ringold, Decatur; Ramji Srinivasan, Duluth, all of Ga.

[73] Assignee: Georgia-Pacific Resins, Inc., Atlanta, Ga.

[21] Appl. No.: 524,669

[22] Filed: Sep. 8, 1995

Related U.S. Application Data

[62] Division of Ser. No. 304,220, Sep. 12, 1994.

[51] Int. Cl.[6] .................................................... C08G 69/26
[52] U.S. Cl. ........................ 528/332; 528/335; 528/397; 528/403; 528/480; 528/486; 528/493; 528/503; 162/167
[58] Field of Search ........................... 528/332, 335, 528/245, 397, 403, 480, 486, 493, 503; 162/167

[56] References Cited

U.S. PATENT DOCUMENTS

| | | |
|---|---|---|
| 2,926,116 | 2/1960 | Keim . |
| 2,926,154 | 2/1960 | Keim . |
| 3,224,990 | 12/1965 | Babcock . |
| 3,372,086 | 3/1968 | Westfall et al. ............ 528/332 |
| 3,914,155 | 10/1975 | Horowitz ................... 162/167 |
| 4,284,758 | 8/1981 | North . |
| 4,343,655 | 8/1982 | Dodd et al. . |
| 4,345,063 | 8/1982 | North . |
| 4,603,176 | 7/1986 | Bjorkquist et al. . |
| 4,605,702 | 8/1986 | Guerro et al. . |
| 4,675,394 | 6/1987 | Solarek et al. . |
| 5,019,606 | 5/1991 | Marten et al. . |

Primary Examiner—James J. Seidleck
Assistant Examiner—Duc Truong
Attorney, Agent, or Firm—Banner & Witcoff, Ltd.

[57] ABSTRACT

A composition of matter (resin) useful for imparting wet strength to paper products is prepared from a polyamine, a polycarboxylic acid or ester, a dialdehyde and epichlorohydrin. Wet strengthened paper products made using the resin are more easily repulped than paper products made with conventional wet strength agents.

5 Claims, No Drawings

REPULPABLE WET STRENGTH RESINS FOR PAPER AND PAPERBOARD

This application is a divisional of copending application Ser. No. 08/304,220, filed on Sep. 12, 1994.

FIELD OF THE INVENTION

The invention relates to a resin composition useful for imparting wet strength to paper products and to wet strengthened paper products made therefrom. The invention also relates to a method of preparing the resin. Paper products prepared using the resin are more easily repulped than paper products made with conventional wet strength agents.

BACKGROUND OF THE INVENTION

Paper is sheet material comprising bonded small, discrete fibers. The fibers are usually formed into a sheet on a fine screen from a dilute water suspension or slurry. Paper is usually made from cellulose fibers although occasionally, synthetic fibers are used. Paper products made from untreated cellulose fibers lose their strength rapidly when they become wet, i.e., they have very little wet strength. The wet strength of paper is defined as the resistance of the paper to rupture or disintegration when it is wetted with water.

Wet strength of ordinary paper is only about 5% of its dry strength. To overcome this disadvantage, various methods of treating paper products have been employed. For example, it is known that wet strength can be increased by parchmentizing paper in sulfuric acid solution or by surface sizing with animal glue and exposing the glue-sized sheet to high temperatures or to a tanning agent to render the protein insoluble in water.

Currently practiced art applying wet strength resins to paper are either of the "permanent" or "temporary" type, i.e., defined by how long the paper retains its wet strength after immersion in water. While wet strength retention is a desirable characteristic in packaging materials, it presents a disposal problem. Paper products having such characteristics are degradable only under undesirably severe conditions. While some resins are known which impart temporary wet strength and thus would be suitable for sanitary or disposable paper uses, they suffer from one or more serious drawbacks. For example, their wet strength is generally of a low magnitude (about one-half of the level achievable for permanent-type resins); they are easily attacked by mold and slime, or they can only be prepared as dilute suspensions.

Urea-formaldehyde and melamine-formaldehyde resins, among others, have been employed to enhance wet strength. These resin types generally suffer from various disadvantages. Absorbency of the paper may, for example, be reduced. Also, since they are utilized in the acid pH range, the deterioration rate of the paper may be increased. Moreover, because these resins contain formaldehyde, serious practical difficulties arise from environmental concerns in the commercial application of such treatments in paper mills. The use of these resins has declined due to concerns for worker safety and health from the presence of formaldehyde in the workplace.

Polyazetidinium chloride-based resins (polyamidoamine-epichlorohydrin reaction products) are established products marketed principally as wet strength resins. Because they are useful in the neutral to alkaline pH range, the use of these epoxidized resins instead of urea-formaldehyde resins not only results in less corrosion of the papermaking machinery but also produces a paper product with improved softness. Among the resins of this type which have heretofore been used are resins produced by reaction of polyalkylenepolyamines with halohydrins, resins produced by reaction of polyalkylenepolyamines with saturated aliphatic dibasic carboxylic acids to yield a first stage polyamide product with subsequent reaction of this first stage product with a halohydrin, and resins produced by reaction of polyalkylenepolyamines with saturated or unsaturated aliphatic di- or polycarboxylic acids, or aromatic polycarboxylic acids, followed by reaction of the resulting polyamide with a halohydrin.

Polyazetidinium chloride-based wet strength resins are substantive to fibers of hydrated cellulosic material such as aqueous suspensions encountered in paper mills. In addition to being self-retaining on cellulose fiber, such resins undergo homo-cross-linking reactions upon a rise in pH, loss of water, and/or increase in temperature to form an insoluble polyamide network. The curing of this type of resin in paper gives rise to orders of magnitude increases in the paper's tensile strength when wetted with water, with levels of wet strength achieved related to amount of resin applied to the paper. U.S. Pat. No. 2,926,154 discloses this water-soluble, cationic, thermosetting polymer produced as a polymeric reaction product of epichlorohydrin and a polyamide derived from a polyalkylene polyamine and certain dicarboxylic acids.

An unfortunate side effect of imparting wet strength to paper through the use of conventional polyazetidinium chloride-based resins is the resulting difficulty experienced in reclaiming or recycling the paper by repulping the material back to its individual fibers. Achieving de-fibering of wet strength treated paper involves exposing the sheet to sufficient heat and to chemical conditions adequate to initiate or maintain amide hydrolysis, while subjecting the paper to the necessary physical forces to break apart the fiber network without appreciably damaging the fibers themselves. The most common approach is to use an alkali (pH$\geq$10), but use of oxidants, such as hypochlorite, persulfate, etc. is sometimes employed with bleached paper. The wet strength imparted to the paper through the use of these resins is of the permanent type.

U.S. Pat. No. 3,372,086 discloses a cationic water-soluble polymer produced in a two-stage reaction system. In the first stage, a polyalkylenepolyamine is reacted with a saturated aliphatic dialdehyde. The resulting resin is then reacted with a halohydrin to give a wet strength resin. More specifically, a polyalkylenepolyamine such as diethylenetriamine is treated with a saturated aliphatic dialdehyde of 2 to 6 carbon atoms such as glyoxal in a proportion of about 0.5 to 2.0 moles of polyalkylenepolyamine per mole of dialdehyde at a temperature of 50°–200° C. for at least 30 minutes and usually for several hours until all the water of reaction has been removed to form a first resin.

This first resin is diluted with water to a solids content of 5–35% and then partially crosslinked by reaction with a halohydrin such as epichlorohydrin, the crosslinking taking place through secondary amine groups of the first resin. The halohydrin is added in an amount sufficient to provide a molar ratio of halohydrin to secondary amine of the first resin of about 0.5 to about 1.5. The time of reaction is 10 minutes to 24 hours, depending on temperature. The resin is then cooled and diluted with water to a solids content of 20% or less and then stabilized by adjusting pH to about 5 with acid. The thus obtained resin is described as a cationic water-soluble thermosetting resin that is cured to a water-insoluble form subsequent to its incorporation in the paper product to effect increased wet strength.

U.S. Pat. No. 3,607,622 discloses a wet strength resin prepared by reacting a polyamidoamine with acrylamide, and then reacting the resulting adduct with a polyaldehyde. Polyamidoamines resulting from the condensation of a polyalkylene polyamide with an organic polybasic acid are suitable. The polyamidoamine is reacted with an amount of acrylamide sufficient to react with substantially all the amine groups in the polyamidoamine. It is disclosed that a lightly alkylated resin can be prepared by adding a small amount of epichlorohydrin during or after reaction of the polyamidoamine with the acrylamide. The polyamidoamine adduct is then reacted with a polyaldehyde.

U.S. Pat. No. 3,914,155 describes a resin for imparting wet strength to paper products. A polyamide is formed by reacting a polyalkylene polyamine with a dicarboxylic acid. The dicarboxylic acids and polyamines are employed in approximately stoichiometric proportions so that essentially all the primary amine groups are converted to amide groups. The ratio of polyamine to dicarboxylic acid is 0.8:1 to 1.4:1. The resulting polyamidoamine is then reacted with formaldehyde at a formaldehyde to secondary amine ratio of 0.5:1 to provide a polyamidol having tertiary amine groups containing —$CH_2OH$ substituents. The polyamidol is then reacted with epichlorohydrin at an epichlorohydrin to amine ratio of 1:1 to 2.5:1 at 40°–100° C.

U.S. Pat. No, 4,233,411 discloses a wet strength resin prepared by reacting polyacrylamide, glyoxal and a cationic regulator selected from the group consisting of a low molecular weight dimethylamine-epichlorohydrin copolymer, a low molecular weight ethylene dichloride ammonia condensation polymer, and a polyvinyl benzyl trimethyl ammonium chloride polymer.

U.S. Pat. No. 3,556,932 discloses ionic (cationic or anionic) water-soluble resins prepared by reacting a vinylamide polymer with glyoxal. The vinylamide content of the polymer provides sites to which the glyoxal (—CHOHCHO) substituents are attached, The vinylamide polymers have sufficient —CHOHCHO substituents to be thermosetting. Paper prepared using the resin is described as having temporary wet strength and as being especially suitable for re-use when slurried in water having a mildly alkaline pH. The magnitude of the wet strength imparted to the paper is subtle enough in practice that the material is often referred to as a dry strength resin.

U.S. Pat. No. 3,734,977 discloses a water-soluble cationic alkylamine-epichlorohydrin polymer which has been grafted with acrylamide and then reacted with glyoxal, Glyoxalation of the acrylamide units render the polymer thermosetting. The resin is described as retaining wet strength during brief contact with moisture but losing much of its strength after a short period of natural weathering. Again, it is apparent that the reactive aldehyde-based temporary wet strength resins offer ease of reclamation at the expense of wet strength magnitude. In fact, to those of ordinary skill in papermaking, the degree of ease of reclamation is considered inversely related to the level of wet strength present in the paper.

U.S. Pat. No. 4,722,964 discloses a wet strength resin made from a polyalkyleneamine-amide, ammonia and epichlorohydrin. The polyalkyleneamine-amide is made by the condensation polymerization of a polyalkylene polyamine and a diester of a saturated aliphatic dibasic carboxylic acid. The resin is prepared by reacting ammonia with part of the epichlorohydrin to form an intermediate that is then reacted with the polyalkyleneamine-amide and the rest of the epichlorohydrin. Paper treated with the resin is described as being easier to repulp than paper treated with conventional epoxidized polyalkyleneamine-amides.

Increased pressure is being placed on the paper industry by environmentally conscious customers. Consumers are demanding that the paper products they buy be capable of being recycled. In addition, stricter legislative standards are being imposed on the paper industry. For some products containing currently used wet strength resins, recycling is difficult. A need exists in the art for new technology which will address the problems currently associated with the use of conventional polyazetidinium chloride-based wet strength resins.

SUMMARY OF THE INVENTION

A method of preparing a polyazetinium chloride wet strength resin which exhibits similar wet strength efficiency compared to conventional wet strength resins and which satisfies the increased customer demand for recycling and reclamation of paper containing wet strength resins has been discovered. The resin is prepared by a three-stage reaction from a polyamine, a polycarboxylic acid or ester, a dialdehyde and epichlorohydrin.

The repulpable wet strength resin of the invention can be produced by first preparing a polyamidoamine by reaction between a polyamine, e.g., a primary terminal diamine, such as diethylenetriamine, and a polycarboxylic acid or ester. The polyamidoamine is then chain extended by reacting it with a dialdehyde. In the final step of the procedure, residual amine moieties, generally secondary amines, on the chain-extended polymer are reacted with epichlorohydrin. The resulting aqueous polyazetidinium chloride solution is then acidified to provide an aqueous wet strength resin of improved stability. This results in the formation of a cationic, thermosetting polymer composition which is self-retaining on paper and imparts suitable wet strength to the paper. More importantly, wet strengthened paper products made using the resin of the present invention are more easily repulped than paper products made with conventional wet strength agents. When subjected to standard repulping conditions, paper made in accordance with the invention repulped in 20–70% of the time required to repulp paper having the same level of wet strength made using conventional polyazetidinium chloride resins.

As used herein, all percentages are on a weight percent basis unless the context clearly suggests otherwise.

DETAILED DESCRIPTION OF THE INVENTION

The invention broadly comprises an aqueous polyazetidinium chloride resin having easily hydrolyzable bonds in its polymer structure. The composition thus allows for easier repulping of paper, yet exhibits similar wet strengthening efficiency compared to conventional wet strength resins. In a first step for preparing the resin, a polyamine is reacted with a polycarboxylic acid or ester at a temperature of about 60° to 250° C. or higher, more usually 150° to 180° C. for several hours to give an oligomeric polyamidoamine prepolymer. In a second step, the polyamidoamine prepolymer is reacted with dialdehyde, generally at ambient temperature, to give a chain-extended polyamidoamine. In a third step, residual amine moieties, generally secondary amine moieties, on the chain-extended polyamidoamine are reacted with epichlorohydrin to give the aqueous thermosetting repulpable wet strength resin of the invention.

Suitable polyamines, also referred to herein as polyalkylene polyamines, which may be used in the invention include diamines of the formula $NH_2(CH_2)_nNH_2$ (where n=2–12), polyamines of the formula $NH_2((CH_2)_nNH)_x-(CH_2)_nNH_2$ (where n=1–4 and x=1–4), branched or cyclic diamines or polyamines and mixtures of these materials. Commercially available polyalkylene polyamines, which are mixtures of linear, branched and cyclic polyalkylene polyamines, also are suitable for use in producing the resin composition of this invention. The term polyalkylene polyamine as employed herein is intended to include polyalkylene polyamines in pure or relatively pure form, mixtures of such materials, and crude polyalkylene polyamines which are commercial products and may contain minor amounts of other compounds.

Illustrative of suitable polyalkylene polyamines are polyethylenepolyamines such as diethylenetriamine, triethylenetetramine, aminoethyl piperazine, tetraethylenepentamine, pentaethylenehexamine, N-(2-aminoethyl)piperazine, N,N-bis(2-aminoethyl)-ethylenediamine, diaminoethyl triaminoethylamine, piperazinethyl triethylenetetramine, and the like. The corresponding polypropylenepolyamines and the polybutylenepolyamines can also be employed. Polyethylenepolyamines are preferred for economic reasons. Due to its availability, diethylenetriamine is particularly preferred for use in the practice of the invention.

Polycarboxylic acids which can be used in the preparation of the inventive resin include saturated aliphatic acids such as succinic, glutaric, 2-methylsuccinic, adipic, pimelic, suberic, azelaic, sebacic, undecanedioic, dodecandioic, 2-methylglutaric, 3,3-dimethylglutaric and tricarboxypentanes such as 4-carboxypimelic; alicyclic saturated acids such as 1,2-cyclohexanedicarboxylic, 1-3-cyclohexanedicarboxylic, 1,4-cyclohexanedicarboxylic and 1-3-cyclopentanedicarboxylic; unsaturated aliphatic acids such as maleic, fumaric, itaconic, citraconic, mesaconic, aconitic and hexane-3-diotic; unsaturated alicyclic acids such as $\Delta^4$-cyclohexenedicarboxylic; aromatic acids such as phthalic, isophtalic, terephthalic, 2,3-naphthalenedicarboxylic, benzene-1, 4-diacetic, and heteroaliphatic acids such as diglycolic, thiodiglycolic, dithiodiglycolic, iminodiacetic and methyliminodiacetic. It is to be understood that esters and anhydrides of such acids can also be used and are considered to be a polycarboxylic acid as this term is defined and used herein. Diacids and diesters of the formula $RO_2C-(CH_2)_nCO_2-R$ (where n=1–10 and R=H, methyl or ethyl) and mixtures thereof are preferred. Adipic acid is readily available and is particularly preferred.

A first step in the preparation of the cationic resin of the invention entails a conventional reaction of a polyalkylene polyamine such as diethylenetriamine with, for example, a dicarboxylic acid such as adipic acid. The reaction may be carried out under anhydrous conditions or in the presence of water. The reaction may occur at temperatures as low as 60° C. but temperatures above about 100° C. are generally employed and temperatures up to about 250° C. or higher may be used, a temperature range of 150° to 180° C. generally being preferred. The polyamide functionality in the resin formed by reaction between the polyamine and the dicarboxylic acid at elevated temperatures is important. Heat must be added to condense the polymers and liberate water. The mole ratio of primary amine to carboxylic acid moiety in the two reactants is generally in the range of 3.0:1 to 0.5:1. A mole ratio range of 2.0:1 to 0.9:1 generally is preferred.

In accordance with the invention, the resulting polyamidoamine then may be diluted with water and reacted with a dialdehyde, such as glyoxal, to form an aqueous chain-extended polymer often having a solids content of 35 to 60% by weight. Suitable dialdehydes which may be used in the practice of the invention include dialdehydes of the formula $OHC(CH_2)_nCHO$ (where n=0–8) and mixtures thereof. Example of suitable dialdehydes include glyoxal, pyruvic aldehyde, succinaldehyde, glutaraldehyde, and 2-hydroxyadipaldehyde. Based on its availability, glyoxal is particularly preferred.

The reaction between the dialdehyde and the polyamidoamine is generally carried out at a pH of about 5 to about 10, at a temperature of from about 20° C. to 30° C. up to about 90° C. and for a period of time of at least about 30 minutes, and preferably for a period of time of at least about 60 minutes up to about 6 hours, or more, the time varying inversely with reaction temperature. Sufficient dialdehyde is preferably added to the polyamidoamine oligomer to provide an equimolar amount of aldehyde moieties to residual primary amine moieties. Generally, the dialdehyde is added to provide a range of between about 1.5 to 0.5 molar equivalents of aldehyde moieties to each mole of primary amine moieties. The product of this chain extension reaction, which is a non-thermosetting, non-wet strength resin, has itself been discovered to be an excellent creping aid. Such resins and the use thereof are part of the broad invention described herein.

The glyoxal (or other dialdehyde) reacts with the primary amine ends of the polyamidoamine oligomers forming —NH—CHOH—CHOH—NH-groups linking two ends of polyamidoamine oligomers. During heating, —NH—CH=CH—NH—groups also may form with the loss of two molecules of water. Reaction of the polyamidoamine with dialdehyde results in the formation of what have been found to be more readily hydrolyzable linkages (—NH—CHOH—CHOH—NH— and —NH—CH=CH—NH—) in the chain-extended polymer than present in the original polyamidoamide.

In a final step of the procedure, the chain-extended polymer is reacted with a halohydrin, generally epichlorohydrin to introduce thermostability into the resin. While the use of epichlorohydrin will hereinafter be described, it is to be understood that other halohydrins are contemplated and could be used in practicing the invention. Epichlorohydrin reacts with available amine groups, usually residual secondary amine groups. To conduct the epichlorohydrin reaction, the chain-extended polymer normally is first dissolved in water to a solids content of about 5 to 50% by weight and then the epichlorohydrin is slowly added to the aqueous solution. A suitable reaction temperature ranges from about 10° C. to 95° C. The time required will vary depending on the reaction temperature. Generally, the reaction is continued until the reaction mixture reaches a particular viscosity endpoint, as is well-known to those skilled in the art. Generally, the reaction is allowed to progress preferably to provide a water soluble cationic resin which has a viscosity of 30–100 cps measured at 25° C. using a 10–25% solids solution of the resin. Epichlorohydrin normally is used on a 0.1 to 1.7 molar ratio basis relative to residual amine moieties, which are generally secondary amine moieties, in the chain-extended polymer. A preferred range of epichlorohydrin to residual amine is about 0.95 to 1.35 moles of epichlorohydrin per mole of residual, generally secondary, amines.

To terminate the epichlorohydrin reaction, as well-known to those skilled in the art, the mixture may be cooled to ambient temperature and adjusted to the desired final solids content. To prolong shelf life, a residual solids content of 30% or less is preferred. The aqueous resin solution often then is stabilized by adjusting it to an acid pH, preferably a pH of from about 3 to about 7, with an acid. A pH range of 4.0 to 6.0 is normally preferred. Either mineral acids such as hydrochloric, sulfuric, nitric and phosphoric acids, or organic acids such as formic and acetic acids, and the like, as well as mixtures thereof, may be employed.

One of the unique and surprising features of this invention is that the dialdehyde is not used in a way to provide any thermosetting function to the resin (which would result in temporary wet strength) as has been practiced in the art. Rather, the dialdehyde of the present invention is used to chain-extend (i.e., to cross-link) the polyamidoamine oligomeric segments yielding a basically linear pre-polymer to which epichlorohydrin is reacted. The resulting polyazetinium chloride functionality provides the thermosetting properties and, hence, a high degree of wet strength more like the conventional "permanent"-type of wet strength resins. The crosslinking and chain extension of the polyamidoamine, polyamine, and polyacid/ester with the dialdehyde has been found to form a polymer backbone containing linkages subject to similar degradation reactions as the reactive aldehyde-based resins of the prior art that provide "temporary" wet strength in their final cured state on the paper. The inventors discovered that the ease of reclamation of paper treated with wet strength resin is more closely related to the degradability of the chemical bonds and the amount of these bonds in the final, cured polymer network present on the paper fibers, as a function of the chemical and mechanical conditions employed in the reclamation step, and less related to curing mechanism or the absolute level of wet strength present in the paper.

The resin prepared in accordance with this process is a cationic, water-soluble, thermosetting polymer composition which is self-retaining on paper and is ideally suited for use as a wet strength resin for paper. Resins of the invention generally have a molecular weight of about 3000 to 50,000 as estimated by reduced or intrinsic viscosity. The resin imparts effectively permanent wet strength to the paper. Permanent wet strength, as used herein, means that no significant wet strength is lost during 24 hours of soaking at ambient temperature. Moreover, repulping time of paper treated with this resin is considerably reduced compared to paper made with conventional wet strength resins, having similar wet strength efficiencies compared to the resin of the invention, imparting advantages with respect to recycling paper made with the resin of the invention.

The cationic water-soluble thermosetting resins of the invention are particularly useful for the production of paper and paper board, such as for example, paper towels, bag paper, map paper, currency paper, diaper carrier, foodboard, linerboard, corrugating medium, carrierboard, bleached board, packing grades, posterboard, filler material, corrugated boxboard, and the like.

The resins can be used in conjunction with fibers of all kinds including but not limited to bleached or unbleached cellulose pulps made by mechanical and/or chemical pulping procedures such as by the Kraft sulfite, sulfate or semi-chemical pulping processes, as well as mixtures of such pulps.

Other ingredients also can be used in conjunction with the wet strength resins of this invention. Additives or ingredients commonly used in papermaking can be used, for example, alum, rosin size, coating colors, mineral fillers such as clay, calcium carbonate, titanium dioxide, talc, calcium silicate, and the like, starch, casein, and the like. The presence of other ingredients, however, is not essential and excellent results are achieved using only the wet strength resins of this invention.

The resin normally may be incorporated into the pulp slurry at any desired point at the wet end of the paper machine. Conventionally, the pulp slurry is deposited onto a screen or wire followed by heating and drying. Instead of adding the resin to the pulp slurry, it also may be applied to the dried or partially dried web. Incorporation into the pulp slurry, however is preferred. The resin generally is added to provide from about 0.1 to about 1.5% resin solids based on the dry weight of the paper fiber. The resin can be added to the paper under acid, neutral or alkaline forming conditions, good results have been obtained by adding the resin to the paper at a pH of between about 4–8, most applications will be used at a pH of between about 5–7.

The cationic water-soluble resin is cured to a water-insoluble form subsequent to its incorporation in the paper product in order to effect an increase in wet strength. Wet strength may be obtained by allowing the resin-treated paper to air dry at room temperature for a prolonged period, such as 24 hours or more. It is preferred, however, to accelerate the cure of the resin by heating the resin-treated paper product. Such heating is suitably accomplished in the drying stage in the operation of conventional paper-making machine, the resins of the invention being readily heat cured during the paper drying operation.

Being cationic, the resin is readily adsorbed by cellulose fibers in aqueous suspensions. It imparts its wet-strengthening effect by reaction both with the cellulose of the paper-making fibers and by forming crosslinks with itself, and does both in the time the wet water-laid web is formed and dried in accordance with paper-mill practice. Drying temperatures normally employed in commercial paper making operations, of about 85° C. to 160° C. for periods of 1 to 5 minutes are fully capable of effecting initial cure of the resins of this invention. As with conventional wet strength resins, complete cure is typically obtained after several days in the (cooling) roll of a paper-making machine in accordance with standard practice.

Wet strengthened paper and paperboard treated with the resins of the present invention show permanent wet strength which is comparable to that of conventional wet strengthened paper products. The wet strengthened paper, however, is more easily repulped than conventional wet strengthened paper currently available.

In the repulping process of the invention, a paper product (paper or paperboard) wet-strengthened with a resin in accordance with the invention described herein is added to an aqueous solution generally at a pH of 4–12 and the aqueous suspension is heated often with agitation at from ambient temperature (i.e, about 20°–30° C.) up to about 75° C. until repulping is complete. When subjected to repulping at a pH of 10 and a temperature of 70° C., paper products made in accordance with the invention can be repulped in 20–70% of the time required to repulp currently available wet strengthened paper products.

The following examples are intended to illustrate the invention further. It is to be understood that these examples are for purposes of illustration only and are not intended to limit the scope of the invention.

EXAMPLE 1

Diethylenetriamine (412.7 g) was added to a 2.5 liter reaction vessel equipped with a mechanical stirrer, thermometer, and distillation condenser. Solid adipic acid (438.4 g) was then added over a 15 minute period while heating at 70° C. Upon completion of addition of adipic acid the temperature of the reaction mixture was increased to 150° C. over a 105 minute period, at which time water began to distill from the reaction vessel. The temperature of the reaction mixture was then increased to 165° C. and held at that temperature for the duration of the reaction. After 5 total hours a slow, steady stream of anhydrous nitrogen was bubbled through the reaction mixture. After 7 total hours the nitrogen gas was halted and the reaction vessel was subjected to a vacuum distillation at ca. 20 in. Hg. for one hour. After a total time of 8 hours the distillation condenser was converted to a reflux condenser and 1553.9 g of water was slowly added via the reflux condenser to the reaction mixture over a one hour period, with the temperature of the reaction mixture dropping from 165° C. to ca. 100° C. The resulting aqueous diethylenetriamine-adipic acid oligomer solution was cooled to 25° C. and had a Gardner-Holdt viscosity of $DE^2$ and a solids content of 47.6%.

To the above diethylenetriamine/adipic acid oligomer (300 g of a 47.6% solids solution) in a 2.5 liter reaction vessel was slowly added glyoxal (27.9 g of a 40.0% aqueous solution) under constant stirring at 25° C. The reaction mixture was heated to 50° C. over a 20 minute period, the Gardner-Holdt viscosity of the solution increasing to $MN^2$. The reaction mixture was cooled to 31° C. over one additional hour with no further increase in viscosity to provide a glyoxal chain-extended polyamidoamine.

To 300 g of a 47.0% aqueous solution of the above glyoxal chain-extended polyamidoamine diluted with an additional 722.9 g of water at 30° C. was then added, at once, with constant stirring, 74.0 g of epichlorohydrin. The reaction mixture was heated to 70° C. over a 165 minute period to give a product having a Gardner-Holdt viscosity of BC. The reaction mixture was then cooled to 25° C. over a 15 minute period to give a solution with Gardner-Holdt viscosity of EF and a pH of 6.52. To the resulting solution was added 388 g of water followed by sufficient 30% acetic acid to adjust the solution to a pH of 5.0. The final aqueous glyoxal chain-extended polyamidoamine-epichlorohydrin resin was obtained by water dilution to a 12.5% solids content.

EXAMPLE 2

A glyoxal chain-extended polyamidoamine was prepared by slowly adding 31.6 g of 40% glyoxal solution in water with constant stirring at 25° C. to a 2 liter flask containing 329 g of a 49.3% solution of a diethylenetriamine/adipic acid oligomer prepared in accordance with Example 1, but without the use of nitrogen or vacuum. The reaction mixture exothermed to about 30° C. and built up a viscosity equivalent to ST on a Gardner-Holdt bubble tube scale. To this mixture was added 908 g of cold water, and stirred. The aqueous mixture was warmed to 30° C. and 91.8 g of epichlorohydrin was added. The reaction mixture was then slowly warmed to about 70° to 73° C. and was held there until the solution reached a Gardner-Holdt viscosity of $E^2F$. This reaction mixture was immediately cooled at 25° C. The mixture was diluted to about 13% solids by adding 525 g of water, resulting in an aqueous composition having a Gardner-Holdt viscosity of $BC^2$. The aqueous resin was split into 4 parts and separately acidified with one of four different acids (acetic acid; acetic acid/sulfuric acid; formic acid; and acetic acid/phosphoric acid) to a pH of 5.2 and was observed for stability and performance.

EXAMPLE 3

A repulpable wet strength resin having a high solids content was prepared as in Example 2. When the reaction mixture had advanced to a Gardner-Holdt viscosity of $EF^2$, two 250 g samples were removed and were stabilized—one with acetic acid (50% conc.) and the other with 50% formic acid. The two samples were at 19% solids. The rest of the bulk was diluted to 15% solids and acidified to pH 5.0 with 50% acetic acid.

EXAMPLE 4

A repulpable wet strength resin was prepared, but the order of addition of water and glyoxal was changed. To a 2 liter reaction flask was added 310 g of a 49.9% solution of a polyamide oligomer, prepared as in Example 1, followed by 841 g of water. To this solution was added 30.2 g of 40% aqueous glyoxal solution and was allowed to react for 1 hour at 28° C. At this point no advancement in viscosity was observed. To the reaction mixture was added 86.9 g of epichlorohydrin, which was reacted as in Example 1.

EXAMPLE 5

A repulpable wet strength resin was prepared using glutaraldehyde instead of glyoxal. To a 2 liter flask was added 300 g of a 49.3% solution of a polyamide oligomer followed by slow addition of 39.8 g of a 50% aqueous solution of glutaraldehyde. The mixture was stirred at 25° C. for one hour, when the mixture increased in Gardner-Holdt viscosity from E to $I^2J$. At this point, 1030 g of water was charged followed by addition of 83.5 g of epichlorohydrin. The temperature of the reaction mixture was slowly raised to 80° C. and its viscosity was allowed to advance until a Gardner-Holdt viscosity of E was attained. The reaction mixture was cooled and acidified with 50% acetic acid to a pH of 5.0.

EXAMPLE 6

A repulpable wet strength resin was prepared with a lower ratio of epichlorohydrin to residual amine. The wet strength resin was prepared as in Example 1, except that only 85% of the normal epichlorohydrin charge was used. The resin was stabilized with various acids at 12.5, 15 and 20% solids at a pH of 4.75 and these stabilized resins were observed for storage stability. The resins showed reasonable stability for over a period of 30–45 days.

EXAMPLE 7

To 426 g of a diethylenetriamine/adipic acid oligomer solution (50.2% solids), 41.8 g of a 40% aqueous glyoxal solution was added and reacted to obtain an aqueous chain-extended resin having a Gardner-Holdt viscosity of ST. 757 g of $H_2O$ was added followed by 9.25 g of epichlorohydrin. The mixture was reacted at 45° C. for 30 minutes after which another 9.25 g of epichlorohydrin was added and was allowed to react at 48°–50° C. for 60 minutes. The resin mixture was cooled to 25° C. and acidified to a pH 6.8 with 50% acetic acid. This aqueous resin is useful as a creping aid.

EXAMPLE 8

206.3 g of diethylenetriamine was added to a 2.5-liter reaction vessel equipped with a mechanical stirrer, thermometer and reflux condenser. To this was added 146.4 g of solid adipic acid with vigorous stirring. In five minutes, the temperature of the vigorous mixture had risen to 135° C. After all the adipic acid had dissolved, the reflux condenser was converted into a distillation condenser and the temperature increased to 175° C. Water was distilled continuously from the reaction mixture over a 15 hour period at atmospheric pressure. The resulting oligomer solidified to a white waxy hydrophilic solid. The oligomer was then dissolved in water and was reacted with a 40% glyoxal solution, the amount of aldehyde added was equivalent to the primary amine available. The total reaction concentration was 50%. The reaction exothermed from 35° C. to about 70° C.

The Gardner-Holdt viscosity of the reaction mixture increased from $A^2A^1$ to GH in about 15 minutes. The reaction was stirred at room temperature until a viscosity of about MN was reached. This chain-extended prepolymer was then reacted with epichlorohydrin. Resins A, B and C were prepared using various charges of epichlorohydrin as summarized in Table 1.

TABLE 1

| Resin | Mole Ratio Of Epichlorohydrin/ Residual Amine | Viscosity | % NV | pH |
|---|---|---|---|---|
| A | 4.0 | $A^2A^1$ | — | — |
| B | 2.0 | $AB^2$ | 19.6 | 6.9 |
| C | 1.3 | FG | 12.5 | 2.9 |

Resin A was prepared at an epichlorohydrin/prepolymer ratio of 4.0. This was calculated on the basis that the prepolymer repeat unit has 4 secondary amines as potential reaction sites with the epichlorohydrin. The reaction stalled and no advancement in the viscosity was observed.

Resin B was prepared with an epichlorohydrin ratio of 2.0. The reaction advanced to a Gardner-Holdt viscosity of $AB^2$ and stalled. The reaction pH was 6.9 and was not acidified with sulfuric acid. After about three weeks the resin had further advanced to BC.

Resin C was prepared with an epichlorohydrin ratio of 1.3. The reaction advanced rapidly to the point of gelation. The reaction mixture was diluted with water and acidified to a pH of 2.9. The entire resin went into solution and its viscosity was about FG. In about 15 hours, viscosity had dropped to $A^2B$.

EXAMPLE 9

Handsheets were prepared using resin A, resin B, resin C and AMRES® 8855. AMRES® 8855 is a prior art polyazetidinium chloride-based wet strength resin available from Georgia-Pacific Corporation. Methods of preparing hand-sheets are known and are conventional in the art. The results are shown in Table 2. The hand sheets preparation has been discussed in the prior art.

TABLE 2

| Sample | Wet Tensile (pli) | Dry Tensile (pli) | % W/D |
|---|---|---|---|
| Control (no resin) | 0.72 ± 0.11 | 18.4 ± 2.6 | 3.9 ± 0.78 |
| AMRES ® 8855 | 4.5 ± 0.68 | 23.5 ± 2.9 | 19.1 ± 3.72 |
| Resin A | 2.51 ± 0.54 | 18.0 ± 4.0 | 13.9 ± 4.20 |
| Resin B (pH4) | 1.57 ± 0.20 | 17.6 ± 2.3 | 8.9 ± 2.31 |
| Resin C (pH7) | 1.54 ± 0.31 | 19.7 ± 3.6 | 7.8 ± 2.3 | pli - pounds per linear inch

EXAMPLE 10

Paper was made at Western Michigan University on their pilot paper machine. 40% Hardwood/60% Softwood bleached pulp was formed into paper at pH 7.0 with the addition of varying levels of prior art (AMRES® 8855) wet strength resin, or the resin of the invention made in accordance with Example 2. The wet and dry strength performance are shown in Table 3.

TABLE 3

| Resin | Usage | Wet Tensile (pli) | Dry Tensile (pli) | % Wet/Dry |
|---|---|---|---|---|
| Ex. 2 | 4#/ton | 4.60 ± 0.43 | 26.30 ± 0.60 | 17.49 ± 1.68 |
| AMRES ® 8855 | 4#/ton | 4.80 ± 0.19 | 23.00 ± 1.2 | 26.87 ± 1.37 |
| Ex. 2 | 7#/ton | 5.48 ± 0.33 | 26.00 ± 1.20 | 21.08 ± 1.60 |
| AMRES ® 8855 | 7#/ton | 5.37 ± 0.49 | 25.20 ± 2.80 | 21.31 ± 3.06 |
| Ex. 2 | 10#/ton | 6.04 ± 0.49 | 27.60 ± 1.3 | 21.88 ± 2.05 |
| AMRES ® 8855 | 10#/ton | 6.17 ± 0.21 | 26.50 ± 1.40 | 23.28 ± 1.46 |

EXAMPLE 11

Soak studies on wet strengthened paper was performed at various pHs. Paper was soaked in water at a pH of 4, 7 and 10 for 24 hours at ambient temperature. The results are shown in Table 4. Breaking length (BL) is a measure of tensile which corrects for basis weight (BW) variation. Breaking length (10"×11" sheet) was calculated using the following formula:

$$BL = \frac{\text{Tensile, pli}}{BW, g} \times 6.81818$$

TABLE 4

| pH | Resin | Basis Weight #/3000 ft² | Soaking Time (mins) | Wet Tensile (pli) | Wet Breaking Length |
|---|---|---|---|---|---|
| 4.00 | AMRES ® 8855 | 42.00 | 1.00 | 5.55 ± 0.66 | 0.90 ± 0.11 |
| | | 42.00 | 20.00 | 5.56 ± 0.26 | 0.90 ± 0.04 |
| | | 42.00 | 60.00 | 5.63 ± 0.13 | 0.91 ± 0.02 |

TABLE 4-continued

| pH | Resin | Basis Weight #/3000 ft² | Soaking Time (mins) | Wet Tensile (pli) | Wet Breaking Length |
|---|---|---|---|---|---|
| | | 42.00 | 1440.00 | 5.52 ± 0.29 | 0.90 ± 0.05 |
| 4.00 | Ex. 2 | 41.60 | 1.00 | 5.20 ± 0.12 | 0.85 ± 0.02 |
| | | 41.00 | 20.00 | 4.94 ± 0.35 | 0.82 ± 0.06 |
| | | 41.60 | 60.00 | 5.32 ± 0.35 | 0.87 ± 0.06 |
| | | 41.60 | 1440.00 | 4.84 ± 0.33 | 0.79 ± 0.05 |
| 7.00 | AMRES ® 8855 | 42.00 | 1.00 | 5.42 ± 0.45 | 0.88 ± 0.07 |
| | | 42.00 | 20.00 | 5.32 ± 0.47 | 0.86 ± 0.08 |
| | | 42.00 | 60.00 | 5.44 ± 0.42 | 0.88 ± 0.07 |
| | | 42.00 | 1440.00 | 5.54 ± 0.25 | 0.90 ± 0.04 |
| 7.00 | Ex. 2 | 41.60 | 1.00 | 5.20 ± 0.33 | 0.85 ± 0.05 |
| | | 41.00 | 20.00 | 4.93 ± 0.31 | 0.82 ± 0.05 |
| | | 41.60 | 60.00 | 5.15 ± 0.42 | 0.84 ± 0.07 |
| | | 41.60 | 1440.00 | 5.12 ± 0.38 | 0.84 ± 0.06 |
| 10.00 | AMRES ® 8855 | 42.00 | 1.00 | 5.65 ± 0.47 | 0.92 ± 0.08 |
| | | 42.00 | 20.00 | 5.42 ± 0.33 | 0.88 ± 0.05 |
| | | 42.00 | 60.00 | 5.27 ± 0.34 | 0.86 ± 0.06 |
| | | 42.00 | 1440.00 | 4.58 ± 0.15 | 0.74 ± 0.02 |
| 10.00 | Ex. 2 | 41.60 | 1.00 | 5.19 ± 0.32 | 0.85 ± 0.05 |
| | | 41.00 | 20.00 | 5.29 ± 0.37 | 0.88 ± 0.06 |
| | | 41.60 | 60.00 | 5.08 ± 0.24 | 0.83 ± 0.04 |
| | | 41.60 | 1440.00 | 4.35 ± 0.26 | 0.71 ± 0.04 |

Both the prior art resin (AMRES® 8855) and the repulpable resin of the invention produce permanent wet strength in paper.

EXAMPLE 12

Repulping was done in a Maelstrom laboratory pulper made by Adirondack Machine Corporation. About 200 g of paper made in accordance with Example 10 using the resin of Example 2 was torn (by hand) to 2" by 3" pieces (approximate) and was added to about 4 liters of water resulting in a 5% pulp consistency. The pH was adjusted to 10 by addition of 20% caustic (NaOH) solution and the pulp slurry was heated to a temperature of 65°–70° C. Small samples of the pulp were visually checked periodically for the presence of any nits (fiber clumps or bundles). Repulping was carried out to completion, i.e., until the paper was totally defibered with no nits present.

While the wet and dry strength performance was equivalent to the standard resin, the paper containing the resin of the invention repulped much more easily. It is seen that the paper wet-strengthened with the resins of the invention repulped faster than paper wet-strengthened with the prior art wet-strength resin. Tables 5 and 6 show repulping of bleached and unbleached paper, respectively, at a pH of 10 at 65°–70° C.

TABLE 5

Bleached Paper

| Resin | Usage | Time to repulp (hrs) |
|---|---|---|
| Ex. 2 | 4#/ton | 1 |
| AMRES ® 8855 | 4#/ton | 3.5 |
| Ex. 2 | 7#/ton | 3.5 |
| AMRES ® 8855 | 7#/ton | 11 |

TABLE 6

Unbleached Paper

| Resin | Usage | Time |
|---|---|---|
| Ex. 2 | 4#/ton | 40 min |
| AMRES ® 8855 | 4#/ton | 130 min |
| Ex. 2 | 7#/ton | 4 hours |
| AMRES ® 8855 | 7#/ton | n.c.* |

*not complete after 12 hours

As can be seen in Tables 5 and 6 paper wet-strengthened with the resin of the invention shows greater repulpability than paper wet-strengthened with prior art resins, while retaining wet strength.

EXAMPLE 13

Repulpability was also compared by repulping paper for set periods of time and then measuring the percentage of "rejects" (the amount of fiber recovered on a vibrating slotted screen; a laboratory version of those used in pulp mills). Unbleached 100% virgin softwood paper made with the wet strength resin of Example 2 of the invention at 4#/ton was repulped as in Example 12 after 30 days of making at 65° C. at pH 8.5 and pH 10.0. Results are shown in Table 7.

TABLE 7

| | | % Rejects | |
|---|---|---|---|
| Time (min) | pH | AMRES ® 8855 | Example 2 |
| 30 | 8.5 | 70.7 | 27.6 |
| 60 | 8.5 | 50.0 | 9.6 |
| 30 | 10.0 | 60.0 | 21.0 |
| 60 | 10.0 | 50.0 | 7.8 |

It will be understood that various changes in the details, materials and arrangements of parts which have been herein described and illustrated in order to explain the nature of the invention, may be made by those skilled in the art within the principle and scope of the invention as expressed in the appended claims.

We claim:

1. A process of treating paper to impart wet strength comprising:

treating pulp fibers used to make said paper with from about 0.1% to about 1.5% by weight dry resin solids based on the dry weight of the pulp fiber of a cationic thermosetting resin made by: (a) reacting a polyamine with a polycarboxylic acid to form a polyamidoamine; (b) reacting said polyamidoamine with a dialdehyde to form a chain-extended polymer; and (c) reacting said chain-extended polymer with epichlorohydrin.

2. The process of claim 1 wherein the fibers are treated with said resin during the formation of said paper.

3. A process for making paper which comprises:

forming a slurry of paper fibers and a cationic thermosetting resin that was made by: (a) reacting a polyamine with a polycarboxylic acid to form a polyamidoamine; (b) reacting said polyamidoamine with a dialdehyde to form a chain-extended polymer; and (c) reacting said chain-extended polymer with epichlorohydrin;

depositing said slurry onto a screen or wire to make a paper web; and drying the paper of said web while curing said resin.

4. A process according to claim 3 wherein the drying is at a temperature of about 85° C. to 160° C.

5. A process according to claim 3 further comprising:

repulping said paper by: (a) adding said paper to an aqueous solution exhibiting a pH of 4–12 to form a repulpable slurry, and (b) heating said repulpable slurry at a temperature of from 20° C. to about 75° C. with agitation until said paper forms a recyclable pulp slurry; and recycling said recyclable pulp slurry.

* * * * *